United States Patent [19]

Veszi

[11] 3,913,096

[45] Oct. 14, 1975

[54] MEASURING DEVICE FOR USE WITH AN ELECTRICAL TRANSDUCER HAVING PARABOLIC RESISTANCE RESPONSE

[75] Inventor: Agnes Veszi, Rueil-Malmaison, France

[73] Assignee: La Telemecanique Electrique, Nanterre, France

[22] Filed: July 27, 1973

[21] Appl. No.: 383,398

[30] Foreign Application Priority Data
Aug. 2, 1972 France .............................. 72.27970

[52] U.S. Cl. ...................... 340/347 NT; 73/362 AR
[51] Int. Cl.² ................... G08C 13/00; H03K 13/17; G01K 7/24
[58] Field of Search ...................... 73/359, 362 AR; 340/347 NT

[56] References Cited
UNITED STATES PATENTS

| | | | |
|---|---|---|---|
| 3,506,818 | 4/1970 | Smith | 340/347 NT UX |
| 3,620,082 | 11/1971 | Peters | 73/362 AR |
| 3,686,665 | 8/1972 | Elias et al. | 340/347 NT X |
| 3,766,782 | 10/1973 | Shimomura | 73/359 |
| 3,828,347 | 8/1974 | Sacks et al. | 340/347 NT X |
| 3,843,872 | 10/1974 | Shimomura | 73/359 X |

FOREIGN PATENTS OR APPLICATIONS 1,962,697  6/1971  Germany ...................... 340/347 NT

OTHER PUBLICATIONS

Harrison, T. J., Four Ramp Integrating Analog-to-Digital Converter, in IBM Technical Disclosure Bulletin, Vol. 11, No. 2, July, 1968, pp. 191–192.

Primary Examiner—Richard C. Queisser
Assistant Examiner—Frederick Shoon
Attorney, Agent, or Firm—William Anthony Drucker

[57] ABSTRACT

Apparatus for measuring a physical quantity by means of a resistance transducer with parabolic response, wherein the transducer, with its two mutually equal wire resistances and two auxiliary resistances are serially supplied with a constant current. Voltages taken from the various terminals of these resistances are applied in succession, via a switching circuit, to an analogue-to-digital converter, preferably of the quadruple ramp type. The auxiliary resistances are selected with a view to obtaining a constant shift of the magnitude measured by the apparatus and to reducing the errors due to the converter. Provision is made for means of introducing non-linearity in the fourth ramp of the converter, so as to linearise the response of the apparatus. Application to the measurement of temperature.

4 Claims, 3 Drawing Figures

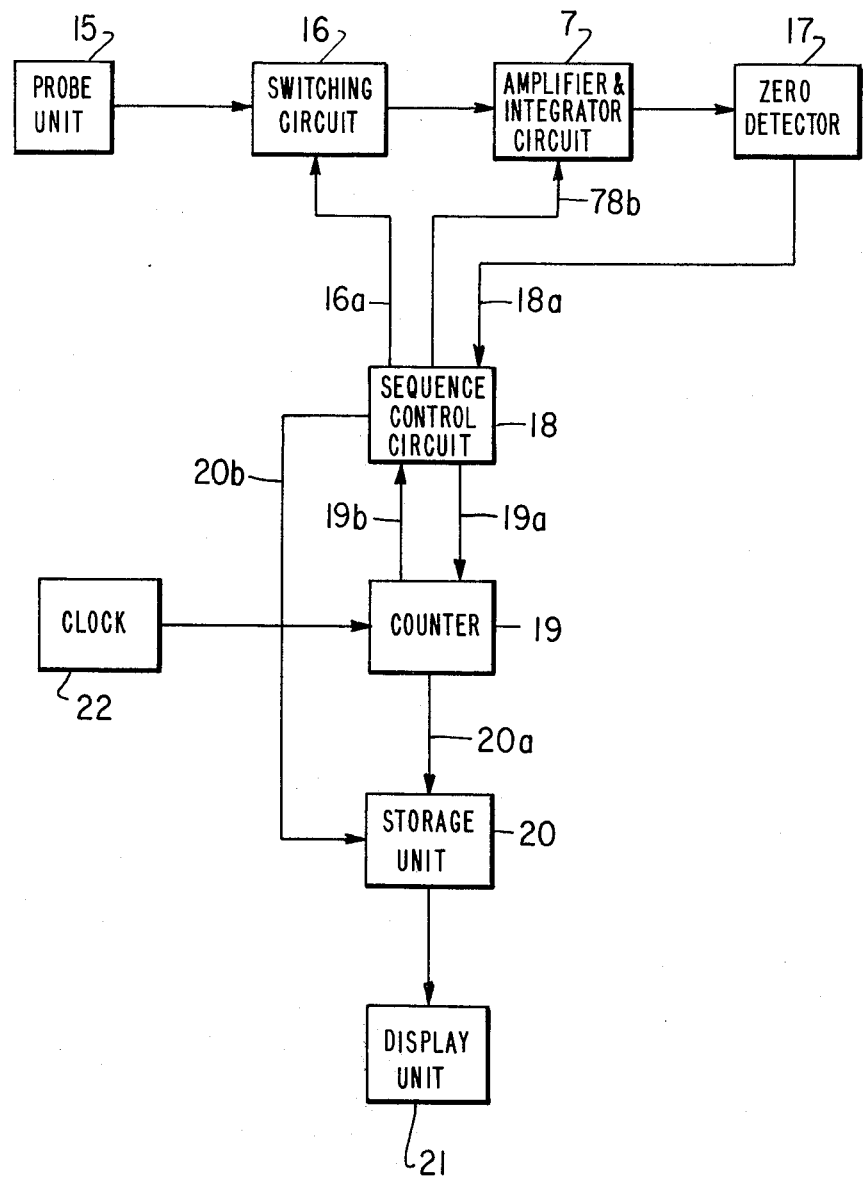

MEASURING DEVICE FOR USE WITH AN ELECTRICAL TRANSDUCER HAVING PARABOLIC RESISTANCE RESPONSE

This invention relates to the measurement of a physical quantity by means of a transducer, the electrical resistance of which obeys a law of parabolic variation in terms of this quantity.

An application of special importance is the measurement of the temperature T by means of a platinum probe. Already familiar are the supply of current to this probe, usually at constant voltage, and the transmission of the signal at its terminals to a display device having amplifying units and, possibly an analogue-to-digital converter, for example, of the linear integrator type.

The transducer element of the probe possesses wires, the natural resistances of which may introduce errors into the results of measurement. The amplifying and conversion units also give rise to drift, offset and other errors.

Known devices do not permit the simple and effective elimination of the effect of these various sources of error, nor do they ensure a reasonably linear response from the display device. A first object of the invention is the elimination of the effect of the wire resistances by having them of identical length and gauge, thereby equalising their natural resistances, and compensating for these natural resistances by subtracting two voltages, one of which is taken from the terminals of an assembly consisting of one wire resistance and one auxiliary resistance, in series, while the other is taken from an assembly consisting of another wire resistance and the transducer element, in series, these different resistances being traversed in series by a constant current, and the auxiliary resistance being taken as equal to the wire resistance.

Another feature of the invention, linked to the preceding one, is that the display device shows the quotient of the difference between the two above-mentioned voltages and a third voltage taken from the terminals of an auxiliary resistance in series with the said resistances, this auxiliary resistance having, preferably, a value such that the product of the resistance value multiplied by the supply current intensity is considerably greater than the error voltage due to the display device circuits.

A further feature of the invention is the use, as a converter element, of a quadruple ramp converter and the application, at the input of the linear integrator which forms part of it, of a current proportional to the output voltage of this integrator across an auxiliary resistance selected in such a way that the integration, during the operation sequence corresponding to the fourth ramp, takes place in accordance with a non-linear law suitable for substantially compensating for the non-linearity of the variation in the signal supplied by the transducer.

The invention will be better understood with the help of the following description.

In the appended drawing:

FIG. 2 shows the four operating sequences of the integrator during a measuring cycle and FIG. 3 is a general diagram, in the form of functional blocks, of the indicating apparatus as a whole.

FIG. 1 depicts a platinum probe 1 having, for example, a resistance of 100 ohms at a temperature of 0° C. of which the resistance R varies, in terms of the temperature T, in accordance with the formula:

$$R = R_o + BT - CT_2.$$

Figure 1:
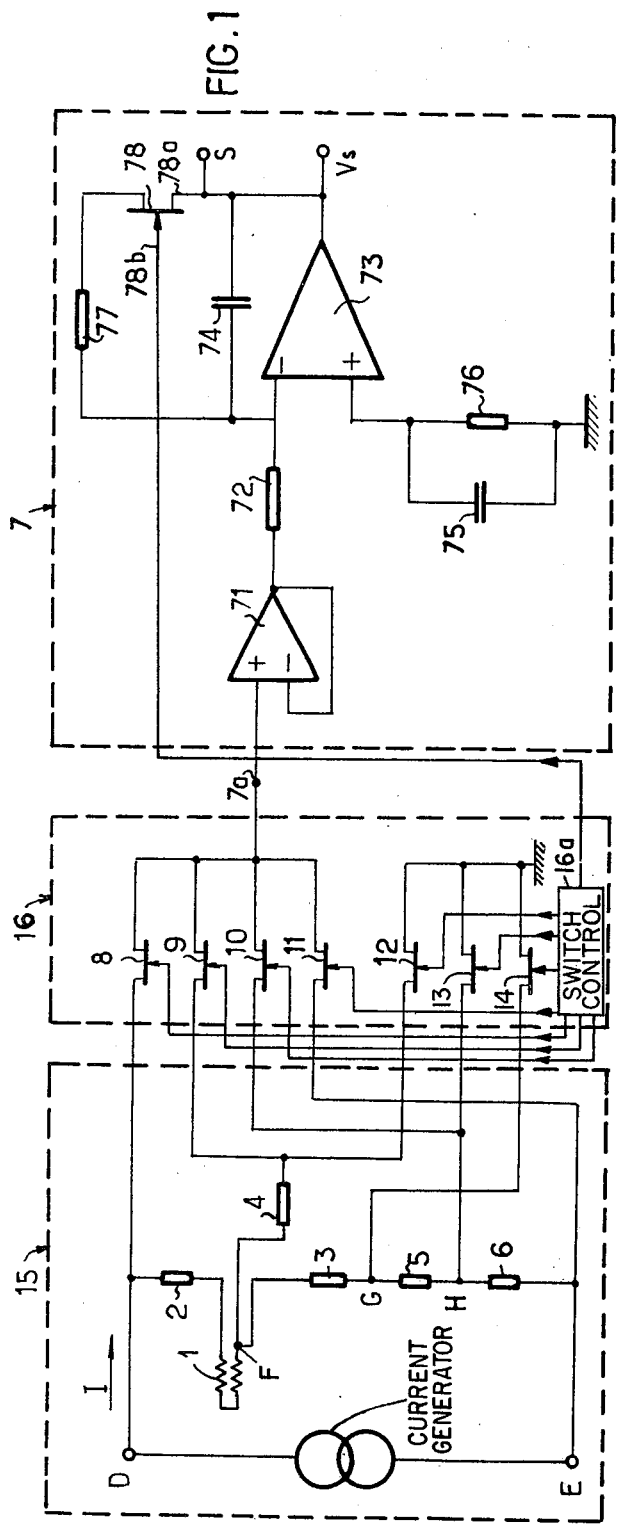
FIG. 1 is a basic diagram of the measuring elements of a temperature indicating apparatus, in accordance with one preferred embodiment of the invention.

Starting with this transducer, a digital display device with a substantially linear response has been developed, giving the indication O for a temperature of 0°C.

The probe is designed to have three wires 2, 3, 4 of identical resistance $R_1$.

According to the invention, the probe is fed from a constant current generator I. This current flows in series, between the terminals D and E of the generator, through the resistances 2, 1, 3 and two auxiliary resistors 5 and 6, having resistance values $R_2$ and $R_3$ respectively.

During a first operating sequence, a voltage I ($R_1 + R_2$), taken from between the points H and F, is applied between the input 7a of an analogue-to-digital converter 7 which serves as a display device and the earth, two circuit-breakers 9 and 13 being then closed.

During the course of a second sequence, a voltage $-IR_2-$ is taken from between the points H and G and applied between the terminal 7a and the earth, two circuit-breakers 10 and 14 being then closed. In a third sequence, a voltage I ($R_1 + R$) is taken from between the points D and F and applied between the terminal 7a and the earth, two circuit-breakers 8 and 12 being then closed. Finally, in the course of a fourth sequence, a voltage $-R_3I$ is taken between the points E and H and applied between the terminal 7a and the earth, two circuit breakers 11 and 13 being then closed. It should be understood that these four sequences make up a cycle which is repeated at a certain rate determined by a logical circuit controlling the circuit-breakers (which have been shown as field effect transistors, the switch control being shown as a block 16a).

The analogue-to-digital converter should preferably be of the type described in French Pat. No. 71,10532 filed by the Applicant on 25 Mar. 1971 for "Process and apparatus for the measurement and digital display of low intensity D.C. electrical signals". It is represented, in a simplified manner, in the form of an operational amplifier 71 connected via a resistor 72 to an integrator consisting of an operational amplifier 73, two condensers 74 and 75 and a resistor 76.

It is understood that such a converter also has control, clock, counting and digital display units which will be described briefly below.

Figure 2:
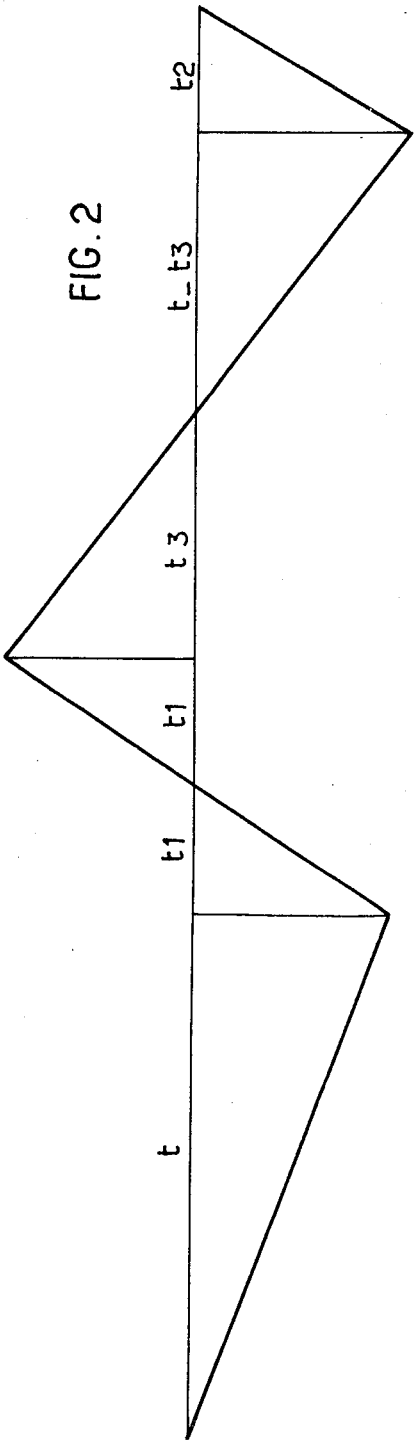

FIG. 2 shows, in terms of time, the output voltage of the integrator during one operating cycle of the apparatus. The first sequence has a duration $t$, predetermined by counting a certain number of clock pulses and by the opening of the circuitbreakers 9 and 13 when this number is reached.

During this period t, the integrator receives a positive input voltage I ($R_1 + R_2$) + $V_o$, $V_o$ being the sum of the error voltages emanating from the circuit-breakers and from the amplifier 71 (drift, offset and other errors). It is thus charged at a negative voltage proportional to the product of I ($R_1 + R_2$) + $V_o$ and (t/RC), RC being the time constant of the integrator.

During the second sequence, the input voltage applied to the integartor is negative, and equal to $V_o - IR_2$. The control units are set so that the duration of this second sequence is 2 $t_1$, $t_1$ being the time required for the output voltage of the integrator to fall to zero. The integrator load is thus the same, apart from the sign, at the end of the second sequence as at the end of the first sequence.

During the third sequence, the input voltage of the integrator is positive, and equal to $I(R + R_1) + V_o$.

A certain time $t_3$ is required for the output voltage of the integrator to fall to zero. The control units are set so that the duration of the third sequence is equal to $t$. The integrator thus takes on a negative load proportional to the product of $I(R + R_1) + V_o$ and $(t - t_3/RC)$.

During the fourth sequence, the input voltage of the integrator is negative, and equal to $V_o - IR_3$. The time $t_2$ required for the integrator load to fall to zero is then determined.

For the purposes of the explanation, the error voltage $V_o$ is initially ignored.

In these circumstances, the charge reached by the integrator at the end of the second sequence is proportional to:

$$t(R_1 + R_2).$$

The time $t_3$ is proportional to $$\frac{t(R_1 + R_2)}{R + R_1},$$

with the result that $t - t_3$ is proportional to:

$$t\left(1 - \frac{R_1 + R_2}{R_1 + R}\right) = t\frac{R - R_2}{R + R_1}.$$

The charge reached at the end of the third sequence is thus proportional to:

$$(t - t_3)(R + R_1) = t(R - R_2).$$

It follows that the time $t_2$ is proportional to:

$$t\frac{R - R_2}{R_3} = t\frac{R_0 + BT - CT^2 - R_2}{R_3}.$$

$R_2$ is then adjusted so that $R_2 = R_0$ giving $$t_2 \sim t\frac{BT - CT^2}{R_3}.$$

As the value of t is known, one finally has:

$$t_2 \sim \frac{B}{R_3} T\left(1 - \frac{C}{B}T\right).$$

It will be noted that the procedure taking place in the apparatus described finally reverts to functioning at constant current and to producing the quotient of the difference between the voltages taken between the terminals FH and FD and the voltage taken at the terminals EH, and this in fact gives the ratio:

$$-\frac{(R_1 + R_2) + (R + R_1)}{R_3} = \frac{R - R_2}{R_3} =$$

$$\frac{R_0 + BT - CT^2 - R_2}{R_3} = T\frac{B}{R_3}\left(1 - \frac{C}{B}T\right).$$

It will be seen that the resistances of the wires of the probe are eliminated (provided that they are equal as between themselves). If the term $T^2$ is ignored, it will be seen that the response of the display device is a straight line passing through the origin of the display temperature axes. This result is obtained by using a constant current and a control resistance $R_2$ equal to the resistance $R_0$ of the probe at the temperature taken as the origin. If now the error $V_o$ is taken into account, it can be shown that the calculation gives a time $$t_2 \sim \frac{BT - CT^2}{R_3(1 - V_o/R_3 I)}$$

This is equivalent to saying that the error $V_o$ is eliminated by the apparatus during the first three sequences, and only occurs during the fourth.

It is now a simple matter to give the resistance $R_3$ a value such that the error term $(V_o/R_3 I)$ due to the apparatus is considerably reduced.

I being in practice given, one can, in a sense, consider the error to be introduced by the apparatus in the form of a resistance $R_E = (V_o/I)$, and that this resistance is divided by $R_3$.

A further feature of the invention is that non-linear term of the display device response is made negligible.

To achieve this, a resistor 77, of resistance value $R_4$, is connected to a point 78a to which is applied a voltage proportional to $-V_S$ ($V_S$ being the output voltage of the integrator) when a circuit-breaker 78 is closed by the logical control unit, which happens only during the fourth sequence of the cycle.

Bearing in mind that the input impedance of the operational amplifier is almost infinite, the total of the three currents at its negative input terminal is zero, with the result that, during the fourth sequence, one has:

$$\frac{V_o - R_0 I}{R_5} + C_1 \frac{dV_S}{dt} - \frac{V_S}{R_4} = 0,$$

in which $R_5$ is the resistance of the resistor 72 and $C_1$ the capacity of the condenser 74. From the preceding formula, one can deduce the relation which follows between $t_2$ and the other parameters:

$$t \cdot \frac{BT - CT^2}{R_3(1 - V_o/R_3 I)} = R_5 C_1 (1 - e^{-t_2/R_5 C_1}).$$

The term $e^{-t_2/R_5 C_1}$ can in practice be assimilated into the first terms of its series development, i.e.:

$$1 - \frac{t_2}{R_5 C_1} + \frac{1}{2}\left(\frac{t_2}{R_5 C_1}\right)^2,$$

with the result that, disregarding the term $V_o(R_3I)$, one has:

$$T \cdot t \; \frac{B}{R_3} \left(1 - \frac{C}{B} T\right) = t_2 \left(1 - \frac{t_2}{2R_5C_1}\right).$$

At $t_2$ is approximately proportional to T, it is possible so to select the value of $R_5$ that one will have, in effect $$\frac{C}{B} T = \frac{t_2}{2R_5C_1}.$$

One then will obtain: $t_2 = (tB/R_3) \cdot T$, that is to say, a substantially linear response.

In FIG. 3, a block 15 represents the input circuit, which is generally designated by the same reference number as in FIG. 1, and 16 is the switching circuit consisting of the circuit-breakers 8 to 14 of FIG. 1. Block 7 represents the amplifier and integrator circuits and block 17 a detector unit for detecting the fall to 0 of the output voltage of the integrator.

Block 18 symbolises the logical control circuits for control of the cyle, and block 19 a counter of the pulses supplied by a clock 22. The result of the measurement (count proportional to the time $t_2$) is stored at the end of each cycle in a storage unit 20, validated at the end of each cycle by block 19 (connection 20*a*) and displayed by a display block 21 having decoding units and digital display tubes of known types.

The apparatus functions as follows: at the start of the first sequence, the counter 19 is at zero and the circuit 18 initiates the count (wire 19*a*). When the maximum capacity of the counter is reached (which happens after the lapse of time $t$), this counter is reset to zero and informs the circuit 18 (wire 19*b*), which then passes to the unit 16 (wire 16*a*) the command to effect the necessary switching operations (opening of the circuit-breakers 9 and 13 and closing of the circuit-breakers 10 and 14).

During the second sequence, which has been thereby set in motion, the counter counts until the detector has passed the zero information to the circuit 18 (via the wire 18*a*), which transmits it to the counter. The counter then starts to count down to a count of zero, which is reached after time $t_1$. The information on the zero count is then passed to circuit 18, which effects the switching necessary to move on to the third sequence (opening of the circuit-breakers 10 and 14 and closing of the circuit-breakers 8 and 12). During the third sequence, the counter starts counting again up to its maximum capacity, but for a period $t_3$, at the end of which it is reset to zero and passes an information to the circuit 18, which then initiates and fourth sequence by opening the circuit-breakers 8 and 12 and closing the circuit-breakers 11 and 13.

During the fourth sequence, the counter counts until it receives a zero information from the detector 17. This zero information validates the transfer, to the store unit, of the count reached by the counter (connection 20*b*), resets the counter to zero and, in consequence, commands the start of a new cycle via circuit 18, which opens the circuit-breaker 11 and closes the circuit-breaker 19. The construction of a logical circuit 18 capable of performing the functions listed above is within the capacity of a skilled man. It will be obvious that the connections between this circuit and the other blocks are more complex than those illustrated.

At the start of the fourth sequence, the circuit 18 also transmits to terminal 78*b* (control electrode of the field effect transistor 78, FIG. 1) the order to close this circuit-breaker.

It is, of course, possible to introduce various modifications to the apparatus which has been described and illustrated without departing from the principle of the invention.

In particular, although the quadruple ramp integrator unit has the important advantage of enabling shift and offset errors to be totally eliminated during the first three sequences of its operation and, thanks to the auxiliary resistor $R_3$, of substantially reducing these errors during the last sequence, which is the measuring sequence as such, and although it also allows for the easy elimination, from the display unit response, of the term $R_0$ introduced by the probe, it is also possible to envisage the use of another conventional type of two-ramp integrator. The sole results of using this modified embodiment of the invention would be to allow the elimination of the resistances of the wires in the probe and the linearisation of the displacement response.

What is claimed is:

1. An apparatus for measuring a physical quantity, said apparatus comprising : a transducer unit having a transducer element (1) with an electrical resistance varying, as a function of said physical quantity, in accordance with a parabolic law, said transducer element having first terminal with a first wire (2) connected thereto and second terminal (F) with second (3) and third (4) wires connected thereto, at least said first and second wires having substantially the same electrical resistance values; a constant current generator having a first terminal (D) connected to said first wire and a second terminal (E); an auxiliary resistor (5) connecting the second wire to the second terminal of the constant current generator; an analog-to-digital converter (7) having an input (7*a*) and providing a digital display of the measured physical quantity; and switching means (16) connecting the first, second and third wires and the auxiliary resistor to the input of the analog-to-ditial converter, whereby there are successively applied to the said input, a first voltage signal appearing across the second terminal (F) of the transducer element and the second terminal (E) of the constant current generator, a second voltage signal appearing across the first terminal (D) of the constant current generator and the second terminal (F) of the transducer element and a third voltage signal appearing across the auxiliary resistor, the analog-to-digital converter including means for forming the quotient of the difference between the first and second voltage signals by the third voltage signal and the said auxiliary resistor having a resistance value substantially equal to the resistance of the transducer element for a predetermined value of the said physical quantity.

2. An apparatus for measuring a physical quantity, said appearatus comprising : a transducer unit having a transducer element (1) with an electrical resistance varying, as a function of said physical quantity, in accordance with a parabolic law, said transducer element having first terminal with a first wire (2) connected thereto and second terminal (F) with second (3) and third (4) wires connected thereto, at least said first and second wires having substantially the same electrical resistance values; a constant current generator having a first terminal (D) connected to said first wire and a second terminal (E), first (5) and second (6) serially connected auxiliary resistors connecting the second wire to the second terminal of the constant current generator, the first auxiliary resistor having a resistance value substantially equal to the resistance of the transducer element for a predetermined value of the physical quantity; an analog-to-digital converter (7) having an input (7a) and providing a digital display of the measured physical quantity; and switching means (16) connecting the first, second and third wires and the first and second auxiliary resistors to the input of the analog-to-digital converter, whereby there are successively applied to the said input, a first voltage signal appearing across the junction point (H) of the first and second serially connected auxiliary resistors and the second terminal (F) of the transducer element, a second voltage signal appearing across the first auxiliary resistor, a third voltage signal appearing across the first terminal (D) of the constant current generator and the second terminal (F) of the transducer element and a fourth voltage signal appearing across the second auxiliary resistor, the analog-to-digital converter including an integrator and means for effecting : during a first operating sequence of predetermined duration, the linear charging of said integrator under the first voltage signal; during a second operating sequence, successively the linear discharging of said integrator down to a zero voltage under the second voltage signal and the linear charging of said integrator under the second voltage signal during a time period equal to that which was required for the said linear discharging down to a zero voltage; during a third operating sequence having the same duration as the first operating sequence, the linear charging of said integrator under the third voltage signal; and, during a fourth operating sequence, the linear discharging of said integrator down to a zero voltage under the fourth voltage signal, the analog-to-digital converter further including means for measuring the duration of the fourth sequence.

3. An apparatus as claimed in claim 2, wherein second auxiliary resistor is predetermined so that the said fourth voltage signal has an amplitude substantially larger than the error voltage introduced by the analog-to-digital converter during the fourth operating sequence.

4. Apparatus as claimed in claim 2, comprising further means, connected to the output of the said integrator, for providing a voltage proportional to the output voltage of the integrator and of opposite polarity; a third auxiliary resistor connected to the input of the integrator, switching means connecting said further means to said third auxiliary resistor and control means for closing said switching means during the second fourth operating sequence, said third auxiliary resistor having a resistance value which is determined so that the third digital display represents a substantially linear measure of the said physical quantity.

* * * * *